US012178775B1

(12) United States Patent
Wang et al.

(10) Patent No.: US 12,178,775 B1

(45) **Date of Patent: *Dec. 31, 2024**

(54) SEXUAL STIMULATION DEVICE

(71) Applicant: Junpeng Wu, Shenzhen (CN)

(72) Inventors: Qinling Wang, Guangdong (CN); Junpeng Wu, Shenzhen (CN); Qinduo Wang, Guangdong (CN)

(73) Assignee: Junpeng Wu, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,153

(22) Filed: May 23, 2024

(30) Foreign Application Priority Data

Feb. 6, 2024 (CN) ......................... 202420286920.3
Apr. 19, 2024 (CN) ......................... 202420835778.3

(51) Int. Cl.
*A61H 19/00* (2006.01)

(52) U.S. Cl.
CPC ............. *A61H 19/44* (2013.01); *A61H 19/34* (2013.01); *A61H 2201/1215* (2013.01); *A61H 2201/1692* (2013.01)

(58) Field of Classification Search
None
See application file for complete search history.

(56) References Cited

U.S. PATENT DOCUMENTS 6,190,307 B1 * 2/2001 Tsai ....................... A61H 19/34 601/51
7,341,566 B2 * 3/2008 Nan ....................... A61H 19/44 601/72
8,152,746 B2 * 4/2012 Nan ................... A61H 23/0263 600/38
9,119,765 B2 * 9/2015 Topolev ................. A61H 19/44
9,655,808 B2 * 5/2017 Peddicord .............. A61H 19/00
9,730,857 B1 * 8/2017 Loya ...................... A61H 21/00
9,737,457 B2 * 8/2017 Allen ..................... A61H 23/02
9,737,458 B1 * 8/2017 Olivares ................ A61H 21/00
10,940,078 B1 * 3/2021 Lee ........................ A61H 19/34
11,123,259 B2 * 9/2021 Baetica .................. G08C 17/02
11,369,545 B1 * 6/2022 He ......................... A61H 7/001
12,064,386 B1 * 8/2024 Yan ........................ A61H 19/34
2011/0230802 A1 * 9/2011 Nan ........................ A61H 19/30 601/46
2012/0316390 A1 * 12/2012 Topolev ................. A61H 19/30 600/38
2013/0178769 A1 * 7/2013 Schmidt ............ A61H 23/0263 601/46

(Continued)

*Primary Examiner* — LaToya M Louis
(74) *Attorney, Agent, or Firm* — Andrew C. Cheng

(57) ABSTRACT

A sexual stimulation device includes a shell, a first driving mechanism and a second driving mechanism. The shell includes a shell body, and first and second massage portions that extend outwardly from the shell body along a first direction. The first massage portion and the second massage portion are configured to be into the human body along the first direction, and the first massage portion extends beyond the second massage portion in the first direction. The first driving mechanism is mounted in the shell for driving the first massage portion; and the second driving mechanism is mounted in the shell for driving the second massage portion. The second driving mechanism includes a swing arm connected to the second massage portion, wherein the swing arm is slidably and rotatably connected to the shell.

16 Claims, 13 Drawing Sheets

(56) References Cited

U.S. PATENT DOCUMENTS

| | | | | | |
|---|---|---|---|---|---|
| 2014/0213846 | A1* | 7/2014 | Lee | A61H 23/0263 | 600/38 |
| 2014/0236151 | A1* | 8/2014 | Lee | A61H 23/0254 | 600/38 |
| 2014/0378758 | A1* | 12/2014 | Mankin | A61H 19/44 | 600/38 |
| 2016/0051438 | A1* | 2/2016 | Hahr | A61H 23/0263 | 601/72 |
| 2016/0120737 | A1* | 5/2016 | Sedic | A61H 19/44 | 601/46 |
| 2016/0166466 | A1* | 6/2016 | Topolev | A61H 23/0263 | 601/46 |
| 2016/0367431 | A1* | 12/2016 | Ferrari | A61H 19/44 | |
| 2017/0095399 | A1* | 4/2017 | Lee | A61H 19/50 | |
| 2017/0239135 | A1* | 8/2017 | Pearson | A61H 19/44 | |
| 2017/0266076 | A1* | 9/2017 | Chen | A61H 19/34 | |
| 2017/0367925 | A1* | 12/2017 | Allen | A61H 19/34 | |
| 2018/0140504 | A1* | 5/2018 | Chang | A61H 99/00 | |
| 2020/0100982 | A1* | 4/2020 | Lee | A61H 23/02 | |
| 2021/0212888 | A1* | 7/2021 | Zipper | A61H 19/44 | |
| 2021/0308000 | A1* | 10/2021 | Sedic | A61H 23/0254 | |
| 2021/0338523 | A1* | 11/2021 | Zheng | A61H 19/44 | |
| 2021/0393475 | A1* | 12/2021 | He | A61H 19/34 | |
| 2024/0050307 | A1* | 2/2024 | Luo | A61H 19/44 | |
| 2024/0189176 | A1* | 6/2024 | Liu | A61H 19/44 | |

* cited by examiner

SEXUAL STIMULATION DEVICE

CROSS-REFERENCE TO RELATED APPLICATIONS

The present application claims priorities to Chinese Patent Application No. 202420286920.3, filed on Feb. 6, 2024, and Chinese Patent Application No. 202420835778.3, filed on Apr. 19, 2024, the entire contents of which are hereby incorporated by reference.

TECHNICAL FIELD

The present application relates to the technical field of sex toys, and in particular to a sexual stimulation device.

BACKGROUND

With the improvement of the human living, in addition to material aspects, more spiritual needs are being pursued. Sexual life has gained more and more attention as a spice of human life, and varied sex toys are developed to add pleasures to sexual life, which satisfy human physiological and psychological needs to a certain extent.

Generally, a sex toy includes a massage head and a motor driving the massage head to do linear reciprocating motion, thereby providing stimulation to a sensitive area of the human body, such as the clitoris, the vagina and the like. However, such sex toy stimulates the human body has a limited stimulation range and unsatisfactory stimulation effect.

SUMMARY

An object of this application is to provide a sexual stimulation device, which has an enlarged stimulation range and better stimulation effect.

To achieve the above object, this application provides a sexual stimulation device that includes:

- a shell including a shell body, and a first massage portion and a second massage portion that extend outwardly from the shell body along a first direction, the first massage portion and the second massage portion being configured to be into the human body along the first direction, the first massage portion extending beyond the second massage portion in the first direction;
- a first driving mechanism mounted in the shell for driving the first massage portion; and
- a second driving mechanism mounted in the shell for driving the second massage portion, the second driving mechanism including a swing arm connected to the second massage portion, wherein the swing arm is slidably and rotatably connected to the shell.

Compared with the prior art, the present application has the following beneficial effects: there are at least two massage portions for simultaneously stimulate two parts of the human body, a stimulation area of this sexual stimulation device is thus enlarged and accordingly a stimulation effect is better. Further, the second massage portion moves along an annular trajectory to knead the vaginal wall or the rectum wall, which is similar to the motion of the human, providing a more comfortable sexual experience, and thus the users are more likely to reach orgasm with the help of the present sexual stimulation device.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

Figure 1:
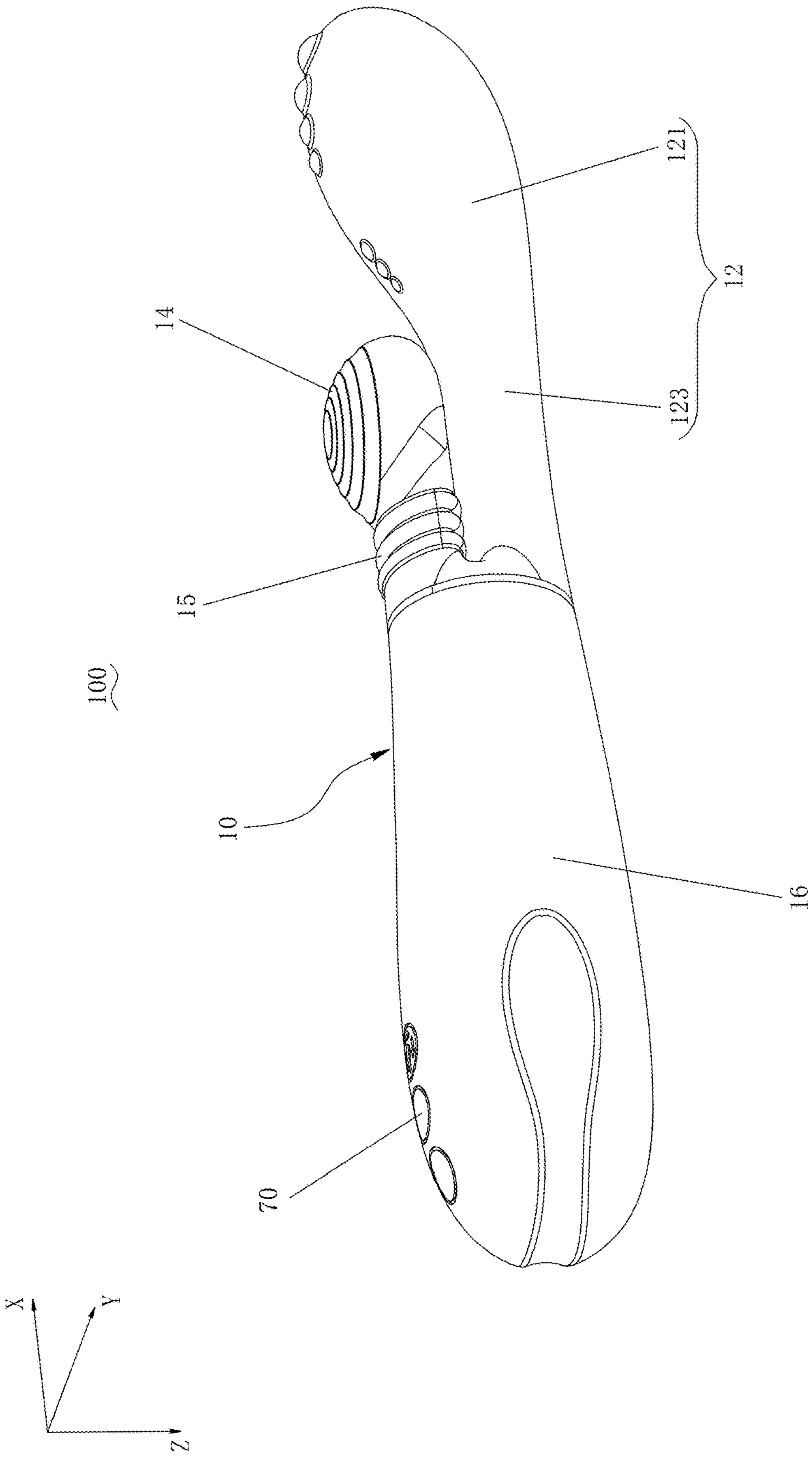
FIG. 1 is a schematic, assembled view of a sexual stimulation device according to an embodiment of the present application.
Figure 2:
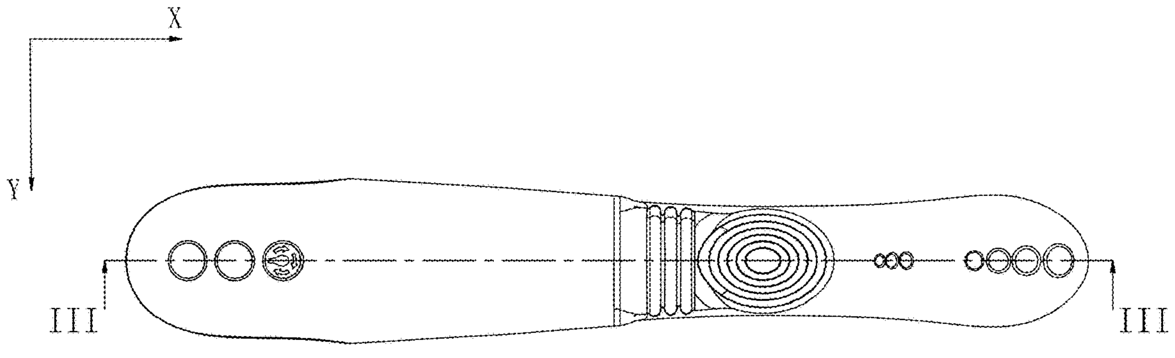
FIG. 2 is a top plan view of the sexual stimulation device of FIG. 1.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-4, a sexual stimulation device according to an embodiment of the present application is shown. In this embodiment, the sexual stimulation device 100 includes a shell 10 being provided with a first massage portion 12 and a second massage portion 14, a first driving mechanism 20 mounted in the shell 10 for driving the first massage portion 12, and a second driving mechanism 30 mounted in the shell 10 for driving the second massage portion 14. The sexual stimulation device 100 of this application includes two massage portions 12, 14, which are respectively driven by two driving mechanisms 20, 30, and thus can simultaneously stimulate two parts of the human body. A stimulation area of this sexual stimulation device 100 is thus enlarged and accordingly a stimulation effect is better.

In an embodiment, the shell 10 is generally elongated and rod-shaped, and further includes a shell body 16. The first and second massage portions 12, 14 extend outwardly from the shell body 16 along a first direction, such as a longitudinal direction of the shell 10 (i.e., X-direction in the drawings), respectively. In the X-direction, the first massage portion 12 has a length greater than that of the second massage portion 14, causing a distal part of the first massage portion 12 to extend beyond the second massage portion 14. In a second direction, such as a lateral direction of shell 10 (i.e., Z-direction in the drawings), the second massage portion 14 and the first massage portion 12 are spaced from each other, so as to ensure that their movements do not interfere with each other and finally not affect the stimulation effect.

During use, the first massage portion 12 and second massage portion 14 of the shell 10 may be inserted into the human body, such as inserted into the vagina, the rectum, and etc. When the sexual stimulation device 100 is used by a male user, the first massage portion 12 may enhance the stimulation to the prostate. When the sexual stimulation device 100 is used by a female user, the second massage portion 14 may enhance the stimulation to the clitoris.

In an embodiment, the first massage portion 12 includes a front end section 121 and a connecting section 123 connected between the front end section 121 and the shell body 16. In the X-direction, the front end section 121 extends beyond the second massage portion 14, that is, the front end section 121 is staggered from the second massage portion 14. In the Z-direction, the second massage portion 14 and the transition section 123 are arranged side by side. Preferably, in the lateral direction of the shell 10, a size of the connecting section 123 of the first massage portion 12 is smaller than a size of the front end section 121, thereby forming an avoidance space for the setting of the second massage portion 14. Preferably, the maximum of the overall lateral size of the second massage portion 14 and the connecting section 123 of the first massage portion 12 is substantially the same as the maximum lateral size of the front end section 121, so that the setting of the second massage portion 14 will generally not increase the overall lateral size of the shell 10.

Figure 3:
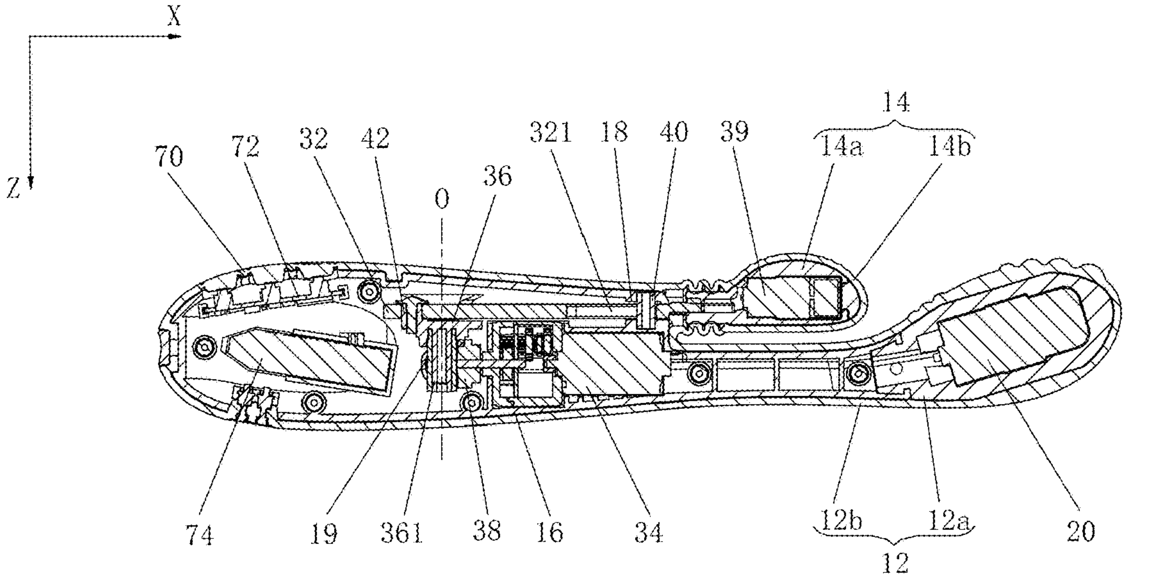
FIG. 3 is a cross sectional view of the sexual stimulation device taken along line III-III of FIG. 2.
Figure 4:
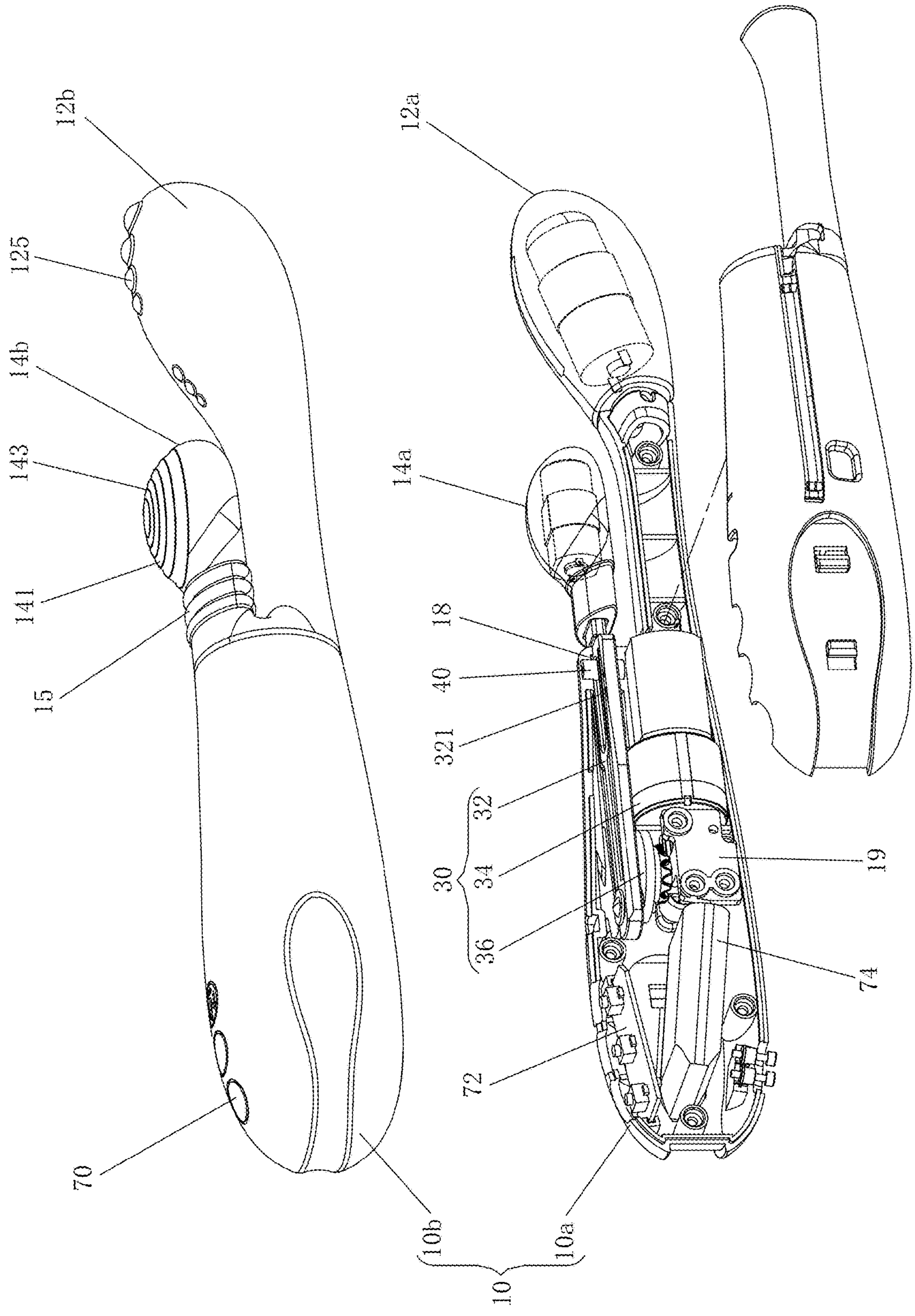
FIG. 4 a schematic, exploded view of the sexual stimulation device of FIG. 1.
Figure 5:
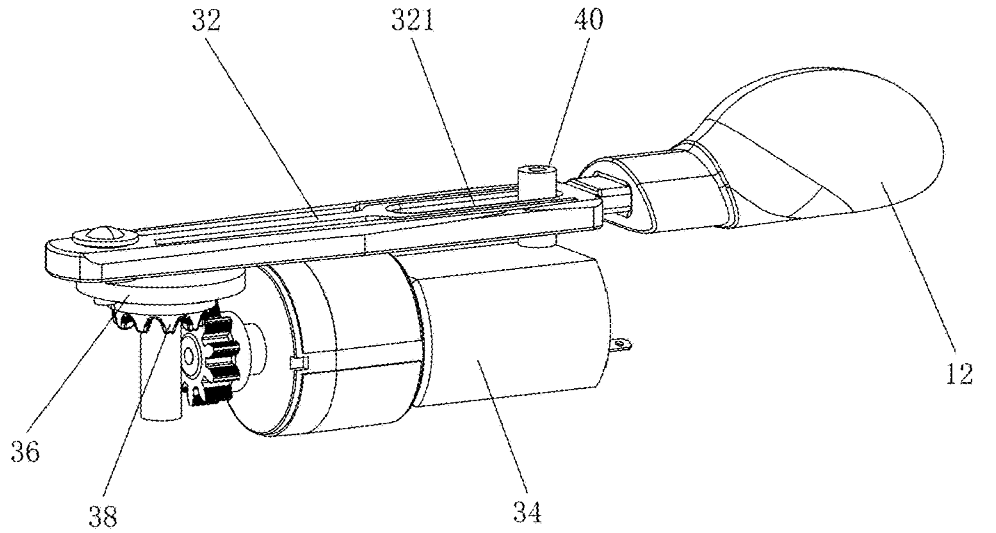
FIG. 5 is a schematic view of a second massage portion and its driving mechanism of the sexual stimulation device.

The first driving mechanism 20 is set in the first massage portion 12, particularly in the front end section 121, for driving the first massage portion 12 to move in the first manner. In an embodiment, as shown in FIGS. 3-4, the first driving mechanism 20 is a first vibration motor. When the first driving mechanism 20 is activated, it drives the first massage portion 12 to vibrate at a certain frequency, stimulating the human body, such as the vagina or the rectum through vibration. It should be understood that during use, the vibration frequency of the first driving mechanism 20 may be adjusted according to the user's needs.

In an embodiment, the second driving mechanism 30 includes a swing arm 32. The swing arm 32 is arranged in the shell body 16 with one end thereof connected to the second massage portion 14, thereby driving the second massage portion 14 to do reciprocating motion. Specifically, the swing arm 32 is slidably connected to the shell 10 by a first shaft 40, allowing the second massage portion 14 to do linear reciprocating motion relative to the shell 10. At the same time, the swing arm 32 is rotatably connected to the shell 10 by a second shaft 42, allowing the second massage portion 14 to do reciprocating swinging relative to the shell 10. The linear reciprocating motion and reciprocating swinging of the second massage portion 14 are superimposed, finally forming an annular trajectory, such as a circular trajectory, an elliptical trajectory and the like. Thus, the second massage portion 14 is driven to knead the sensitive area of the human body, such as the vaginal wall of the woman, stimulating the crus of clitoris.

In an embodiment, as shown in FIGS. 5-8, the swing arm 32 is generally an elongated plate with a longitudinal direction thereof being consistent with the X-direction. A middle portion of the swing arm 32 is slidably connected to the shell 10 through the first shaft 40, and another end of the swing arm 32 is pivotally connected to the shell 10 through the second shaft 42. The axial direction of the first shaft 40 and the second shaft 42 is basically consistent with the Z-direction and perpendicular to the swing arm 32. When the second shaft 42 is driven to rotate around an axis O in a longitudinal plane, such as the XY-plane, which is perpendicular to the Z-direction, due to the limitation of the first shaft 40, the rotational motion of the second shaft 42 is transformed into the linear reciprocating motion of the swing arm 32 in the X-direction and the reciprocating swinging in the XY-plane, finally driving the second massage portion 14 connected to the swing arm 32 to move along a circular trajectory.

In an embodiment, the swing arm 32 is provided with a sliding groove 321 at a portion thereof adjacent to the second massage portion 14. The sliding groove 321 is elongated and extends along the X-direction. The first shaft 40 is inserted into the sliding groove 321, with a diameter generally equivalent to a width of the sliding groove 321 but much smaller than a length of the sliding groove 321. Through the cooperation of the first shaft 40 and the sliding groove 321, the swing arm 32 can slide relative to the first shaft 40 along its length direction; and the swing arm 32 and the first shaft 40 are relatively fixed in the width direction of the swing arm 32. In the illustrated embodiment, the shell 10 is provided with a first support seat 18 at a position corresponding to the first shaft 40, and an end of the first shaft 40 extends beyond the sliding groove 321 and is inserted into the first support seat 18.

Figure 9:
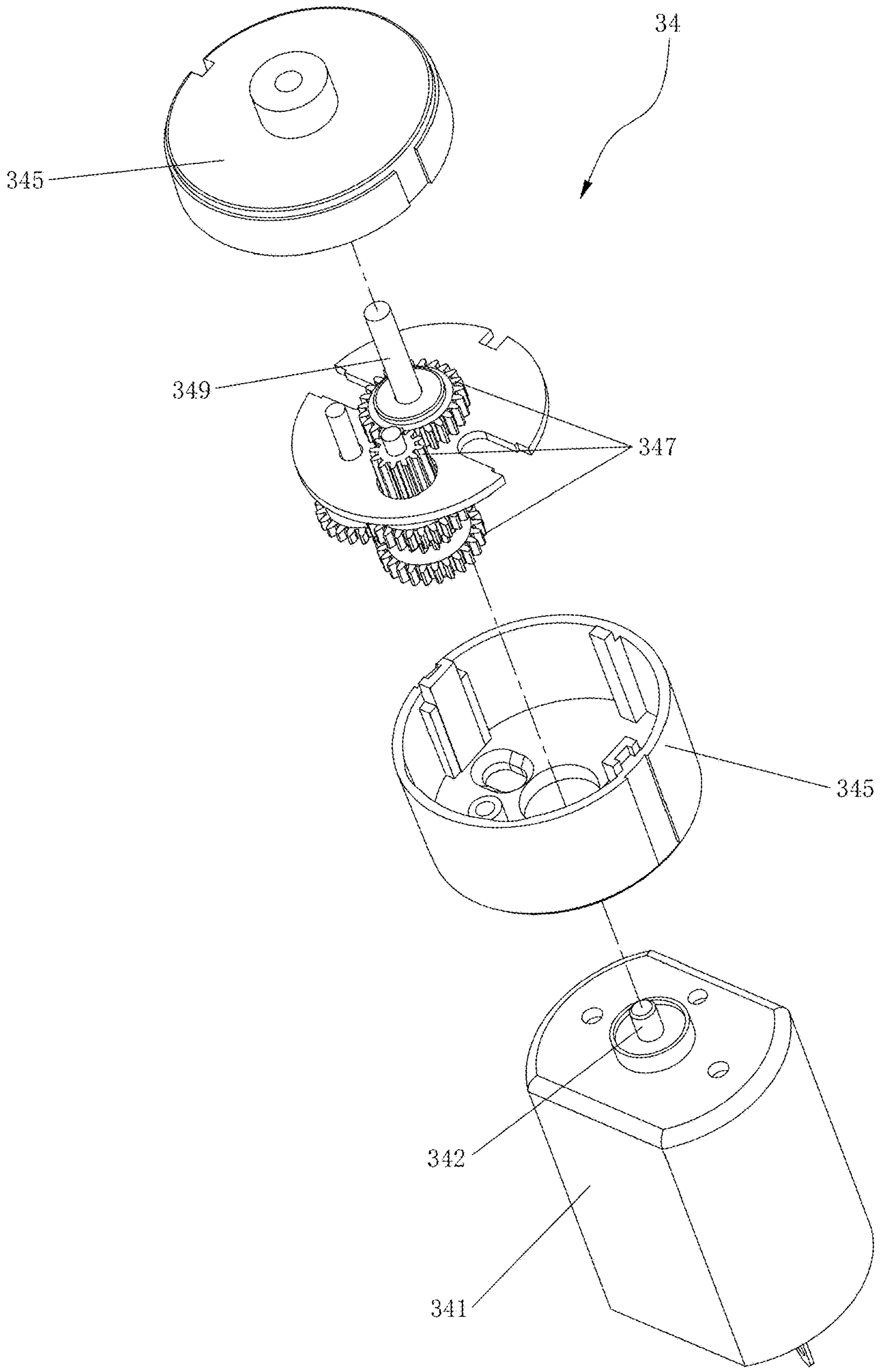
FIG. 9 is a further exploded view of a gearbox of the driving mechanism of FIG. 5.

In an embodiment, the second driving mechanism 30 further includes a gearbox 34 and a rotary member 36 connected to the gearbox 34 for power transmission. Referring to FIG. 9, the gearbox 34 includes a motor 341 and a gear unit 343. The motor 341 serves as a driving component of the sexual stimulation device 100 and has an output shaft 342 rotating at high-speed. The gear unit 343 includes a gear housing 345 and a plurality of gears 347 arranged in the gear housing 345. The gears 347 mesh with each other, and a reduction ratio of the whole gear unit 343 can be determined according to the gear ratios between the meshed gears 347. In an embodiment, the reduction ratio of the gear unit 343 is not less than 4:1 and not more than 100:1, and an output speed of the gearbox 34 is not exceed 1000 rpm. That is, a speed of an output shaft 349 of the gearbox 34 does not exceed 1000 rpm.

The rotary member 36 is connected to the output shaft 349 of the gearbox 34 in a transmission way. Under the driving of the gearbox 34, the rotary member 36 rotates about the axis O, wherein the axis O may be a central axis of the rotary member 36. Preferably, a speed of the rotary member 36 does not exceed 1000 rpm. The shell 10 is provided with a second support seat 19 at a position corresponding to the rotary member 36, and a rotating shaft 361 extends outwardly from the rotary member 36 into the second support seat 19. Preferably, the rotating shaft 361 is rotatably inserted into the second support seat 19. The second shaft 42 is eccentrically arranged on the rotary member 36, and rotates around the axis O under the driving of the gearbox 34.

In an embodiment, the second shaft 42 and the rotary member 36 may be integrally formed as one piece. The another end of the swing arm 32, which is away from the second massage portion 14, is provided with a shaft hole 323, and the second shaft 42 may be rotatably inserted into the shaft hole 323. Preferably, a fixing hole 44 is provided in the second shaft 42, and a rod portion of the fixing member 46, such as pins, rivets, screws, etc., is inserted into the fixing hole 44 of the second shaft 42, and a head portion of the fixing member 46 abuts against the swing arm 32 at a periphery of the shaft hole 323, so as to fix the second shaft 42 and the swing arm 32 in the Z-direction. In this way, the second shaft 42 will not automatically detach from the shaft hole 323 of the swing arm 32, ensuring the connection stability between the swing arm 32 and the rotary member 36.

In some embodiments, the second shaft 42 may be integrally formed on the swing arm 32, and a shaft hole may be formed on the rotary member 36 corresponding to the second shaft 42. Alternatively, the second shaft 42 may be formed separately and then pivotally connected to the swing arm 32 and/or the rotary member 36.

When the gearbox 34 is started, the output shaft 342 of the motor 341 rotates at high speed. After being slowed down by the gear unit 343, the rotary member 36 rotates at an appropriate speed, such as no more than 1000 rpm. The second shaft 42 rotates around the axis O, driving the swing arm 32 to rotate. The swing arm 32 generates displacement in both its length and width directions. Due to the engagement between the first shaft 40 and the sliding groove 321, the movement of the swing arm 32 in its length direction is not restricted, allowing the swing arm 32 to slide along its sliding groove 321 relative to the first shaft 40; and the movement of the swing arm 32 in its width direction is limited by the first shaft 40, causing the swing arm 32 to rotate relative to the second shaft 42 and thus generate swing.

Figure 10:
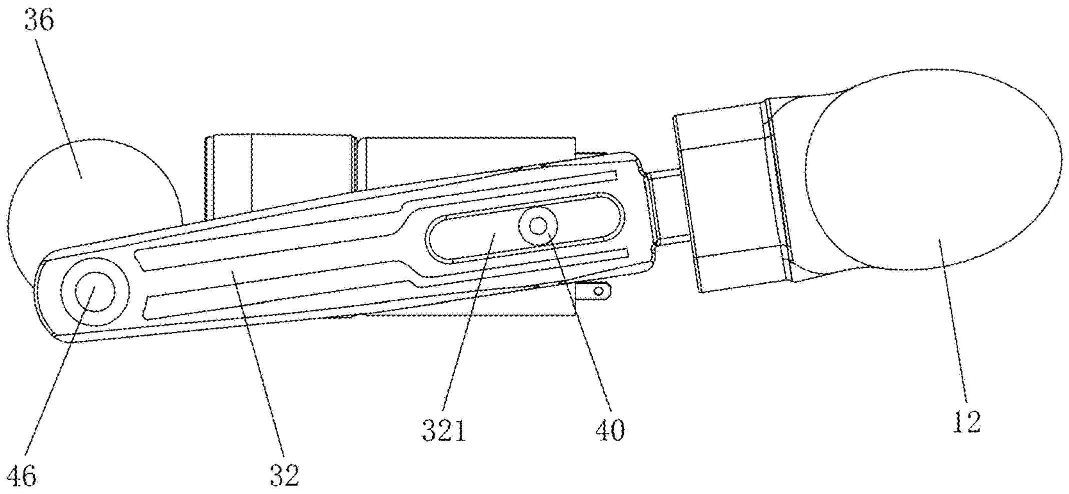
FIG. 10 is a schematic view of a first intermediate state of the second massage portion.
Figure 11:
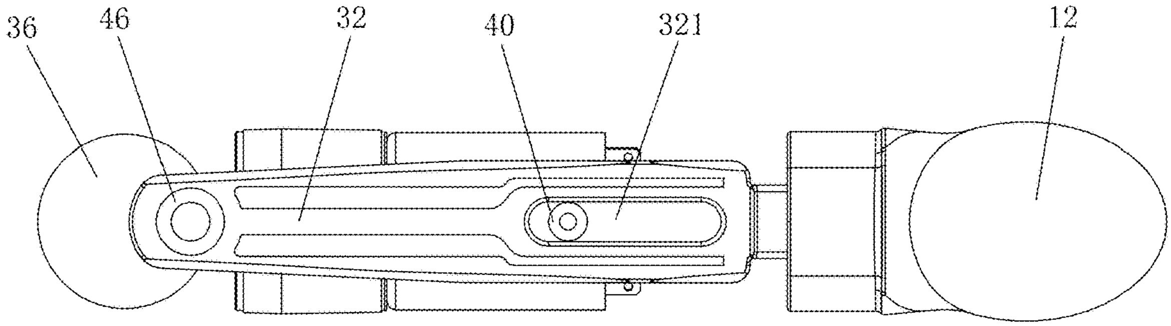
FIG. 11 is a schematic view of a second intermediate state of the second massage portion.
Figure 12:
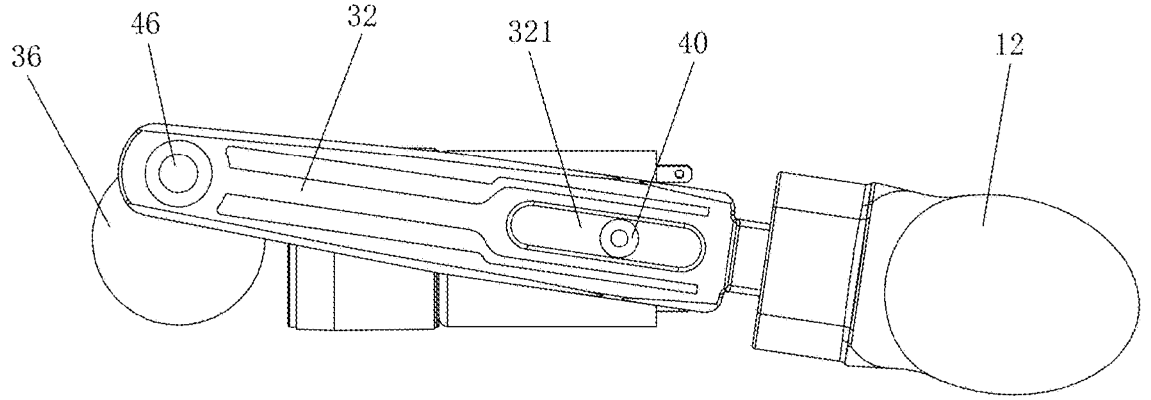
FIG. 12 is a schematic view of a third intermediate state of the second massage portion.
Figure 13:
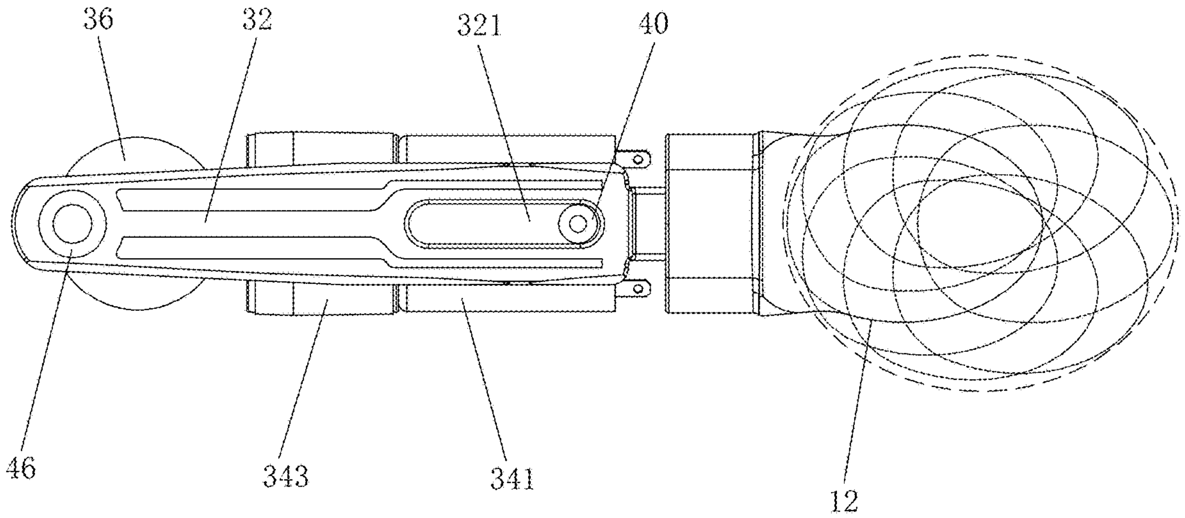
FIG. 13 is a schematic view of trajectory of the second massage portion.
Figure 14:
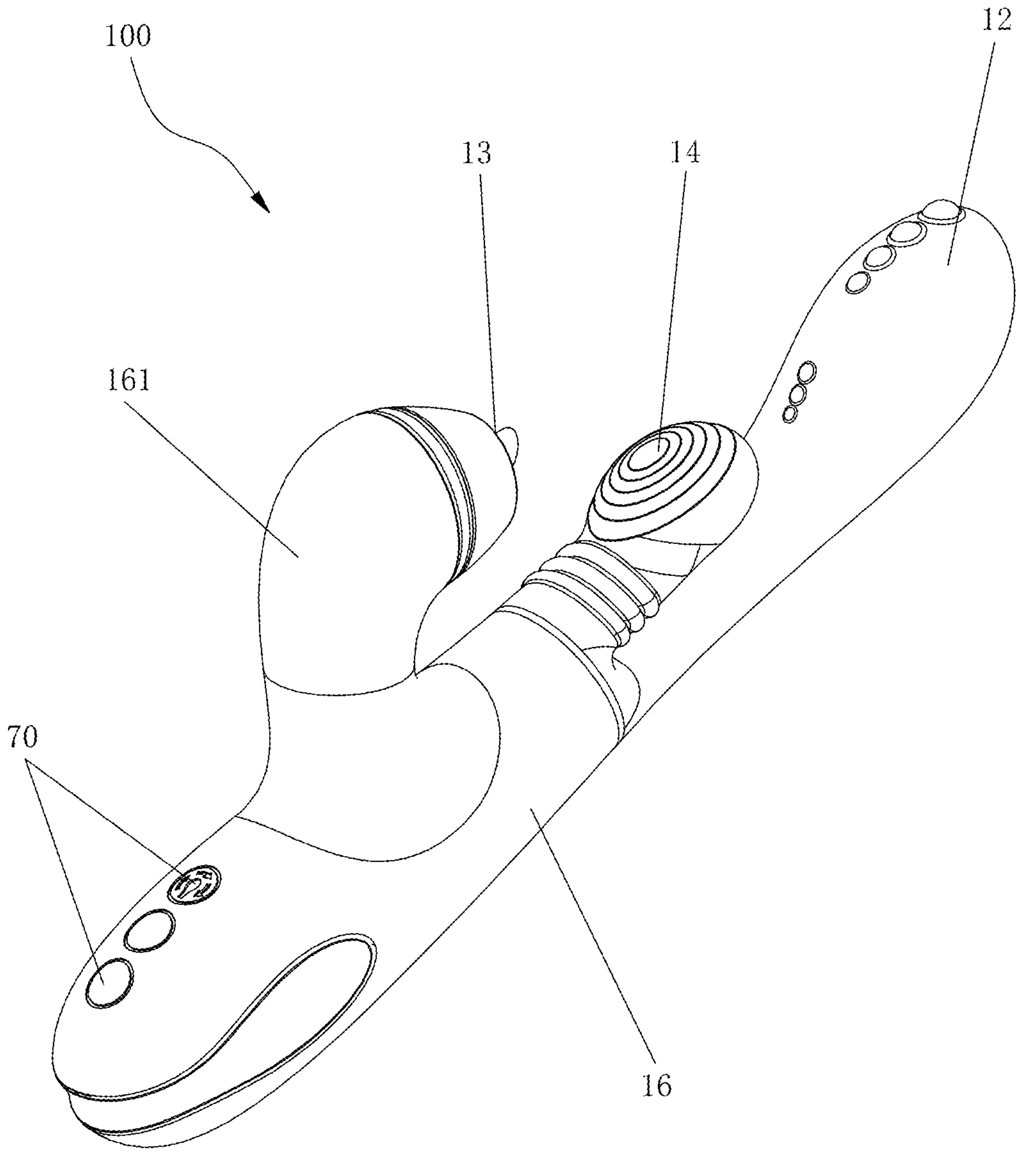
FIG. 14 is a schematic, assembled view of a sexual stimulation device according to a second embodiment of the present application.
Figure 15:
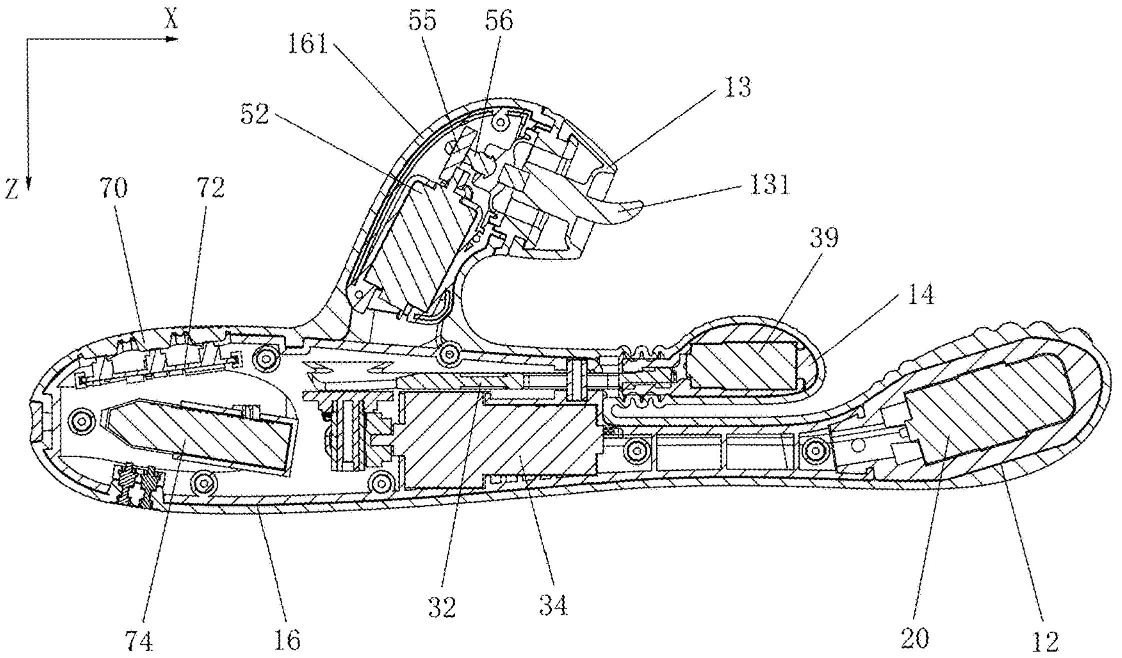
FIG. 15 is a cross sectional view of the sexual stimulation device of FIG. 14.

As shown in FIGS. 10-12, as the rotation angle of the second shaft 42 around the axis O changes, the swinging center of the swing arm 32 continuously changes. The swing arm 32 simultaneously generates two different reciprocating movements, namely the linear reciprocating movement of the swing arm 32 in the X-direction and the reciprocating swing of the swing arm 32 in the XY-plane. The combination of these two reciprocating movements drives the second massage portion 14 connected to the swing arm 32 to move along a circular or elliptical trajectory in the XY-plane, as shown by the dashed line in FIG. 13.

Preferably, the length of the swing arm 32 is not less than 2 centimeters, allowing the swing arm 32 and the second massage portion 14 connected to the swing arm 32 to have a larger stroke, thereby an area of the human body kneaded by the second massage portion 14 being enlarged and accordingly a stimulation effect being better. In an embodiment, the trajectory of the second massage portion 14 is substantially an elliptical trajectory, and the major axis of the elliptical trajectory is not less than 1 centimeter. In another embodiment, the trajectory of the second massage portion 14 is substantially a circular trajectory, and the diameter of the circular trajectory is not less than 1 centimeter.

Compared to the existing sexual stimulation devices which stimulate the human body by hitting in high-frequency, the second massage portion 14 of the present sexual stimulation device moves along an annular trajectory, and thus kneads the sensitive area of the human body. An area of the human body kneaded by the second massage portion 14 is enlarged and accordingly a stimulation effect is better. Moreover, the second massage portion 14 kneads the human body, which is similar to the motion of the hand, providing a more comfortable sexual experience.

Figure 6:
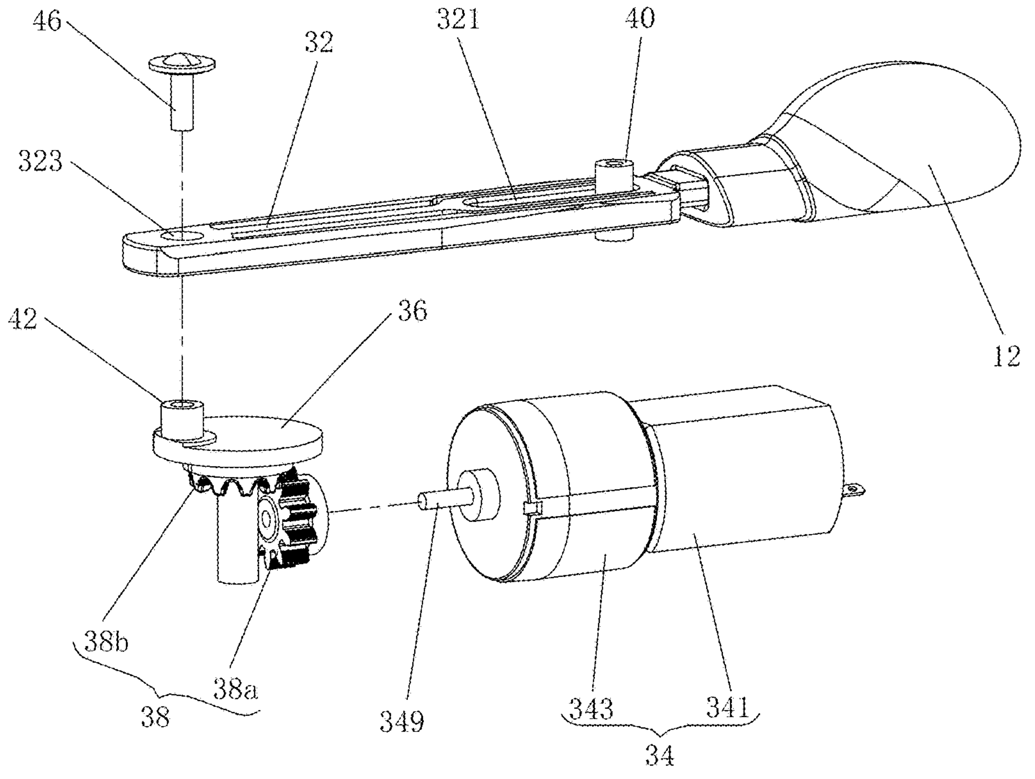
FIG. 6 is an exploded view of FIG. 5.
Figure 7:
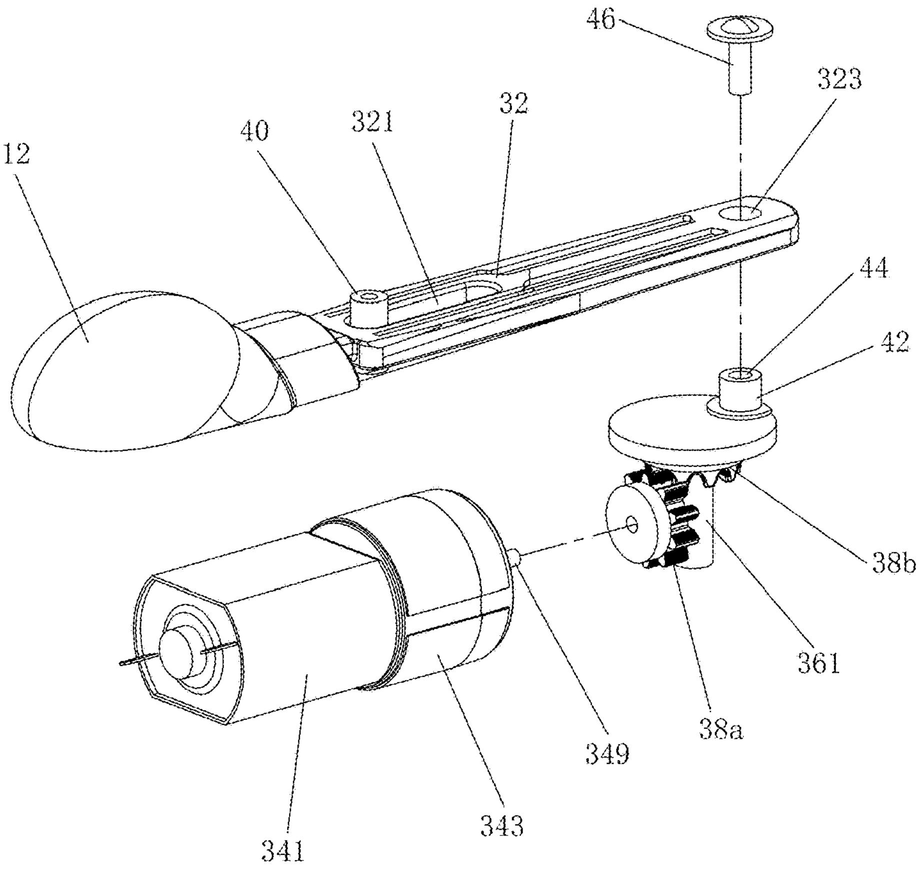
FIG. 7 is an exploded view of FIG. 5 shown from another aspect.
Figure 8:
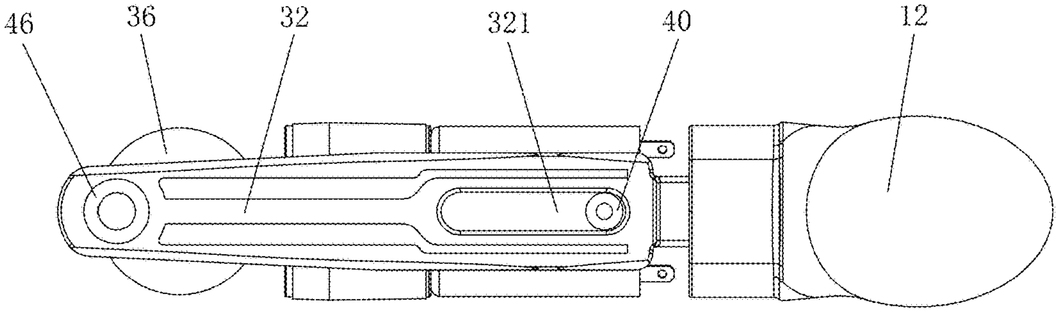
FIG. 8 is a top plan view of FIG. 5.

In an embodiment, as shown in FIGS. 6-7, a steering unit 38 is provided between the rotary member 36 and the gearbox 34. By means of the steering unit 38, the direction of power transmission may be changed, facilitating the arrangement of the gearbox 34. In the illustrated embodiment, the gearbox 34 is arranged with its output shaft 349 being generally parallel to the swing arm 32. The steering unit 38 is located at an axial end of the gearbox 34 and the swing arm 32. In this way, a space below the swing arm 32 may be utilized to set the gearbox 34, which is conducive to the miniaturization of the device.

Specifically, the steering unit 38 is a steering gear unit, and includes a plurality of gears that mesh with each other, such as a first gear **38*a*, a second gear 38*b*, and etc. The first gear 38*a* is mounted around the output shaft 349 of the gearbox 34, preferably the first gear 38*a* and the gearbox 34 are arranged coaxially. The second gear 38*b* is mounted around the rotating shaft 361 of the rotary member 36, preferably the second gear 38*b* and the rotary member 36 are integrally formed as on piece. The first gear 38*a* and the second gear 38*b* may be bevel gears and mesh with each other, achieving a change of 90 degrees in the direction of power transmission between the gearbox 34 and the rotary member 36**.

In other embodiments, the direction of power transmission can be determined based on the internal space of the sexual stimulation device 100, and the angle that needs to be changed is not limited to 90 degrees. Users can choose corresponding type of steering unit according to their needs to achieve direction change, which should not be limited by specific embodiments. In some embodiments, the steering unit 38 may also be integrated inside the gearbox 32, thereby a separate steering unit is no longer needed. Alternatively, in some embodiments, there is no need for direction change between the gearbox 34 and the rotary member 36, and thus the steering unit 38 may be omitted.

As shown in FIGS. 3-4, the second driving mechanism 30 may further include a second vibration motor 39 set in the second massage portion 14. The second massage portion 14 is driven by the gearbox 34 to move in a circular trajectory, and also vibrates at a predetermined frequency under the action of the second vibration motor 39. In this way, while kneading the stimulated area, the second massage portion 14 may generate deep stimulation on the stimulated area through vibration, generating a dual stimulation effect on the human body, and accordingly having a better stimulation effect.

In an embodiment, the shell body 16 may serve as a handle of the sexual stimulation device 100, facilitating holding and operation. The shell body 16 is provided with buttons 70 thereon, which may be touch type buttons and/or mechanical buttons. The shell body 16 is provided with a control circuit board 72 therein, which forms a control circuit with the gearbox 34, the first vibration motor, the second vibration motor 39, and etc. The user can control the operation of the sexual stimulation device 100 through the buttons 70, including controlling the speed and direction of the gearbox 34, the vibration frequency of the first vibration motor and the second vibration motor 39, and etc. A battery 74, preferably a rechargeable battery, is provided inside the shell body 16. The battery 74 is connected to the control circuit board 72 electrically and serves as a power source of the sexual stimulation device 100.

In an embodiment, as shown in FIGS. 3-4, the shell 10 may be a double-layer structure, and includes an inner shell 10*a* and an outer shell 10*b* enclosing the inner shell 10*a*. The inner shell 10*a* is made of hard materials such as plastic, metal, etc., which has a relatively high strength and thus provides support for the components mounted inside the shell 10, such as the first driving mechanism 20, the second driving mechanism 30, and etc. The outer shell 10*b* is made of flexible materials such as silicone, rubber, and etc., and has a soft touch. Preferably, after the inner shell 10*a* being assembled with the first driving mechanism 20, the second driving mechanism 30, etc., the outer shell 10*b* is formed on the inner shell 10*a* integrally through over-molding, achieving good sealing effect for the components inside the shell 10. The outer shell 10*b* plays a waterproof and dustproof role, facilitating the cleaning and storage of the sexual stimulation device 100.

As shown in FIG. 3, the first massage portion 12 and the second massage portion 14 are both double-layer structures. The first massage portion 12 includes a first hard layer 12*a* and a first soft layer 12*b* covered on the first hard layer 12*a*. The second massage portion 14 includes a second hard layer 14*a* and a second soft layer 14*b* covered on the second hard layer 14*a*. The hard layers 12*a*, 14*a* may be part of the inner shell 10*a*, while the soft layers 12*b*, 14*b* may be part of the outer shell 10*b*.

The end of the swing arm 32 is inserted into the second hard layer 14*a* of the second massage portion 14, and is fixedly connected to the second hard layer 14*a* through snap-fitting, welding, bonding, interference fitting, and etc., so as to drive the entire second massage portion 14 to move. The second hard layer 14*a* can better transmit the force of the swing arm 32 to the second massage portion 14, allowing the second massage portion to have a larger swing and/or movement range, thereby having a larger stimulation range. The second soft layer 14*b* provides a soft touch and a certain buffer for the second massage portion 14, making the stimulated area of the human body more comfortable. Preferably, the end of the swing arm 32 can be integrally fixed in the second hard layer 14*a* during the process of forming the second soft layer 14*b*, which not only simplifies production and assembly, but also enhances the connection strength between the second massage portion 14 and the swing arm 32.

In this embodiment, the second soft layer 14*b* of the second massage portion 14 is integrally connected to the outer shell 10*b* corresponding to the shell body 16, and wrinkles 15 are formed at a joint of the second soft layer 14*b* and the outer shell 10*b*. The second hard layer 14*a* of the second massage portion 14 is disconnected from the inner shell 10*a* at a position corresponding to the wrinkles 15, making the second massage portion 14 be easier to deform during movement for the wrinkles 15 at the joint of the second massage portion 14 and the outer shell 10*b*. The second massage portion 14 thus may have a larger swing and/or movement amplitude, thereby having a larger stimulation range.

In this embodiment, an outer, lateral surface of the second massage portion 14 away from the first massage portion 12, such as the upper surface of the second massage portion 14 in FIGS. 1-4, serves as a massage surface 141 of the second massage portion 14, for kneading the stimulated area that is in contact with it. When in use, unlike the point-to-point hitting of existing sexual stimulation devices, the second massage portion 14 always maintains surface contact with the stimulated area, such as the vaginal wall, the rectum wall, and etc., and the a contact position is constantly changing, achieving the effect of kneading. Preferably, the massage surface 141 of the second massage portion 14 is a convex surface, which can better interact with the stimulated area.

In the embodiments shown in FIGS. 1-4, there are protrusions 125 provided on an outer surface of the first massage portion 12, so as to enhance the stimulation effect to the vaginal wall or the rectum wall. The massage surface 141 of the second massage portion 14 is provided with patterns 143, such as annular patterns, to enhance the stimulating effect to the vaginal wall or the crus of clitoris. In other embodiments, the outer surface of the first massage portion 12 may have patterns formed thereon, and the massage surface 141 of the second massage portion 14 may have protrusions formed thereon. The protrusions, patterns, and etc. may be formed on the entire outer surface of the first massage portion 12 and/or the second massage portion 14, or may be formed on a portion of the outer surface of the first massage portion 12 and/or the second massage portion 14.

Figure 18:
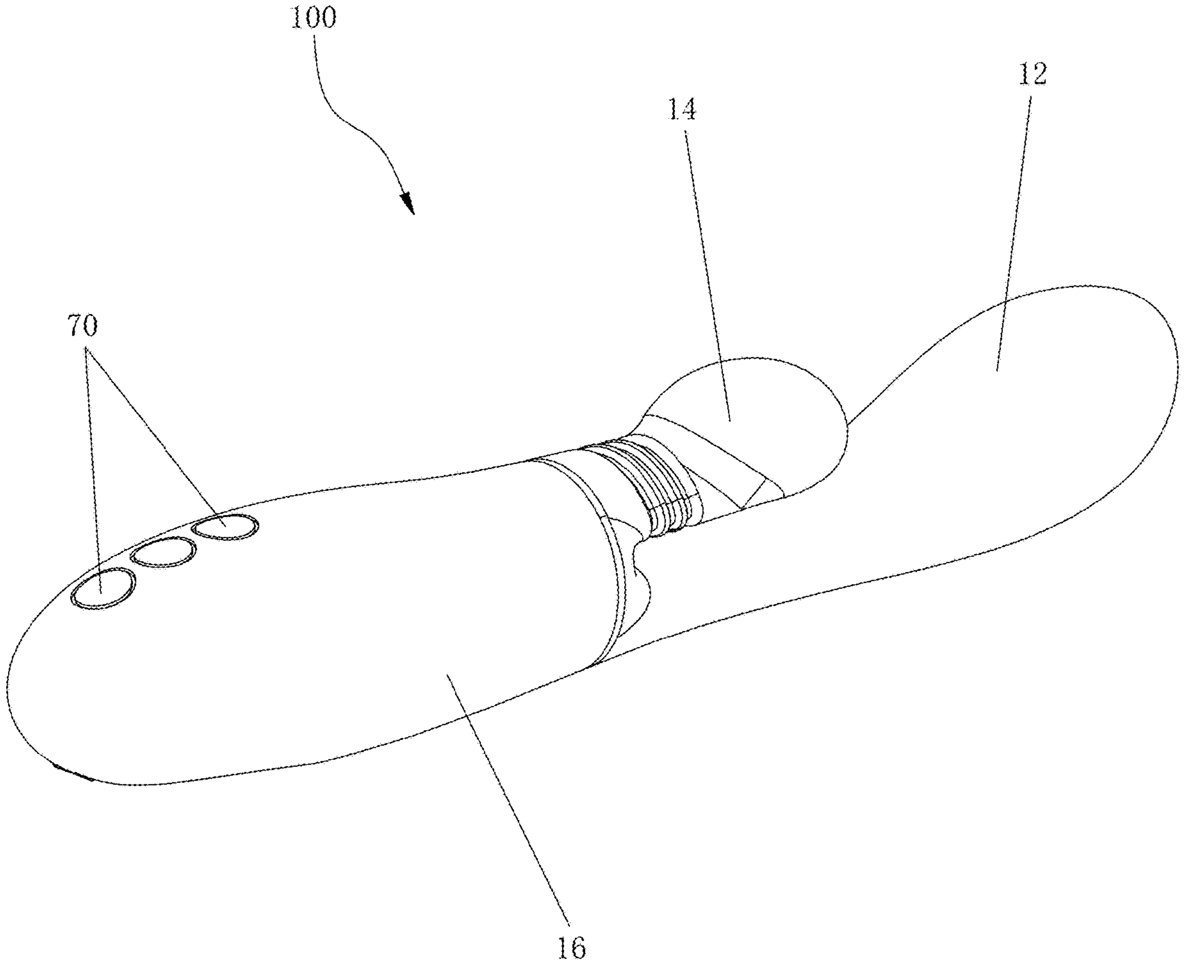
FIG. 18 is a schematic, assembled view of a sexual stimulation device according to a third embodiment of the present application.

It should be understood that under the driving of the first driving mechanism 20 and the second driving mechanism 30, the first massage portion 12 and the second massage portion 14 themselves can generate sufficient stimulation to the human body. In some embodiments, the outer surfaces of the first massage portion 12 and/or the second massage portion 14 may be smooth surfaces, as shown in FIG. 18.

Figure 19:
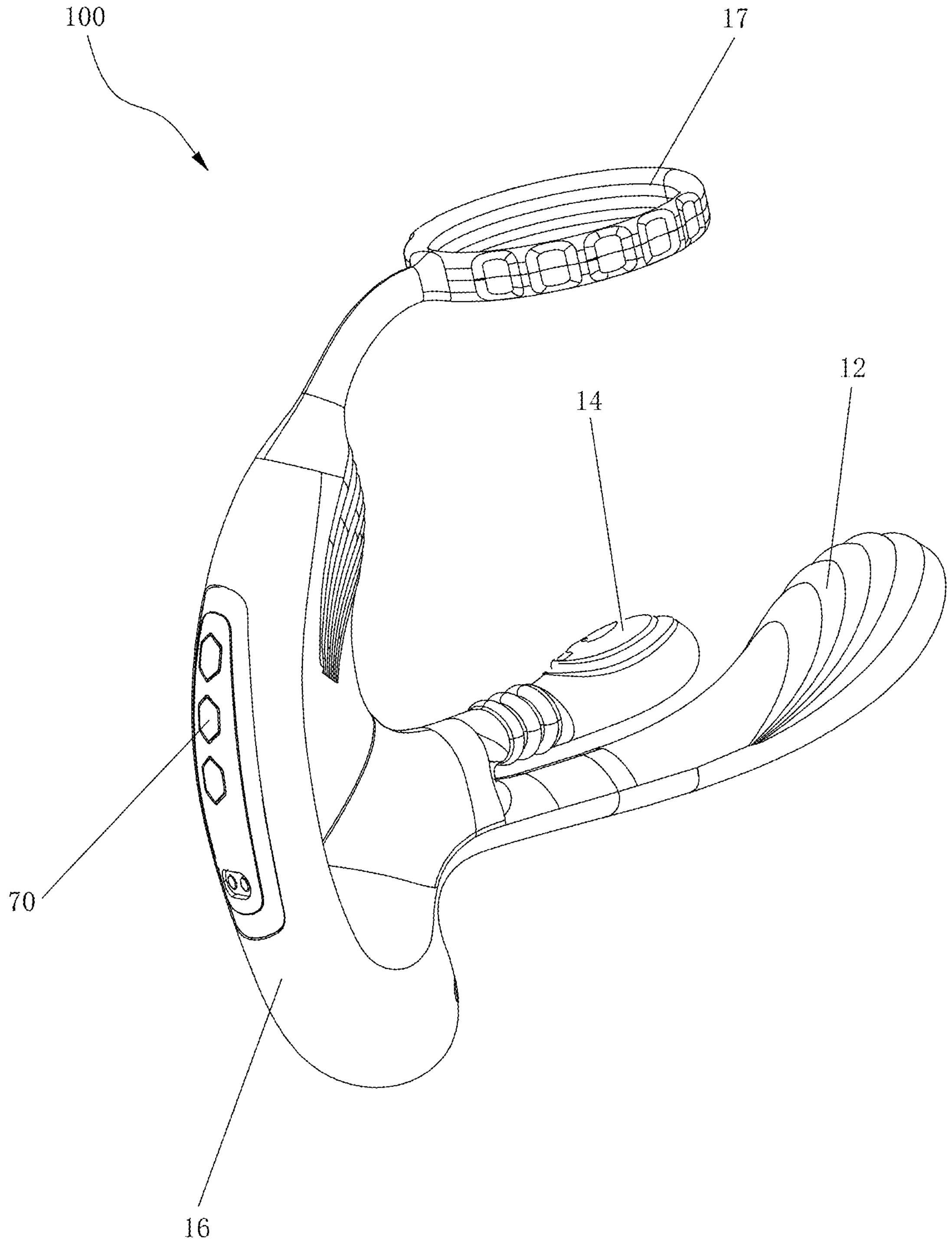
FIG. 19 is a schematic, assembled view of a sexual stimulation device according to a fourth embodiment of the present application.

In some embodiments, as shown in FIG. 19, an annular ring 17 is provided on the shell body 16 of the sexual stimulation device 100. The annular ring 17 may be formed separately and then connected to the shell body 17, or may be formed integrally with the shell body 17. The sexual stimulation device 100 may be fixed onto the human body, such as on the penis or the scrotums, by the annular ring 17.

In the above embodiment, the entire outer shell 10*b* of the shell 10 is an integrated structure made of flexible materials such as rubber, silicone, and etc., so that the outer layers of the first massage portion 12 and the second massage portion 14, namely the soft layers 12*b* and 14*b*, have a soft touch, increasing the comfort of use. In other embodiments, the outer layers of the first massage portion 12 and the second massage portion 14 may be made of other flexible materials that can directly contact the skin, which is not limited in the present application. Furthermore, it should be noted that as long as the outer layers of the first massage portion 12 and the second massage portion 14 are soft layers, the outer layer of the shell body 16 may be either a soft layer or a hard layer.

During the use of the sexual stimulation device 100, the user may activate the first driving mechanism 20 to achieve a stimulation effect to the vagina through the high-frequency vibration of the first massage portion 12; or, the user may activate the second vibration motor 39 of the second driving mechanism 30 to achieve a stimulation effect to the crus of clitoris through the high-frequency vibration of the second massage portion 14; or, the user may activate the gearbox 34 of the second driving mechanism 30 to achieve a kneading effect to the crus of clitoris through the movement of the second massage portion 14; or, the user may simultaneously activate multiple or all of the teeth box 34, first vibration motor, and second vibration motor 39 to experience a multi-stimulation effect to the vagina and the crus of clitoris, which is convenient in use.

Referring to FIGS. 14-17, a sexual stimulation device according to another embodiment of the present application is shown. In this embodiment, the sexual stimulation device 100 includes a shell 10 being provided with a first massage portion 12, a second massage portion 14, and a third massage portion 13, and a first driving mechanism 20, a second driving mechanism 30, and a third driving mechanism 50 mounted in the shell 10. The first driving mechanism 20 is used to drive the first massage portion 12, the second driving mechanism t 30 is used to drive the second massage portion 14, and the third driving mechanism 50 is used to drive the third massage portion 13. Among them, the first massage portion 12, the second massage portion 14, the first driving mechanism 20, and the second driving mechanism 30 are generally the same as the forgoing embodiments, and will not be described here.

In this embodiment, a branch 161 extends upwardly and slightly forwardly from the shell body 16, and the third massage portion 13 is provided at a distal end of the branch 161. In the X-direction, the third massage portion 13 is not exceed the position of the second massage portion 14. In the Z-direction, the third massage portion 13 is located above the second massage portion 14 and is separated from the second massage portion with a certain distance, thereby forming a space therebetween to accommodate a part of the human body, such as the vulva of the woman. Preferably, the distance between the third massage portion and the second massage portion 14 is much greater than the distance between the second massage portion 14 and the first massage portion 12. In this embodiment, the third driving mechanism 50 is arranged in the branch 161 of the shell 10 and connected to the third massage portion 13 in a transmission way.

Figure 16:
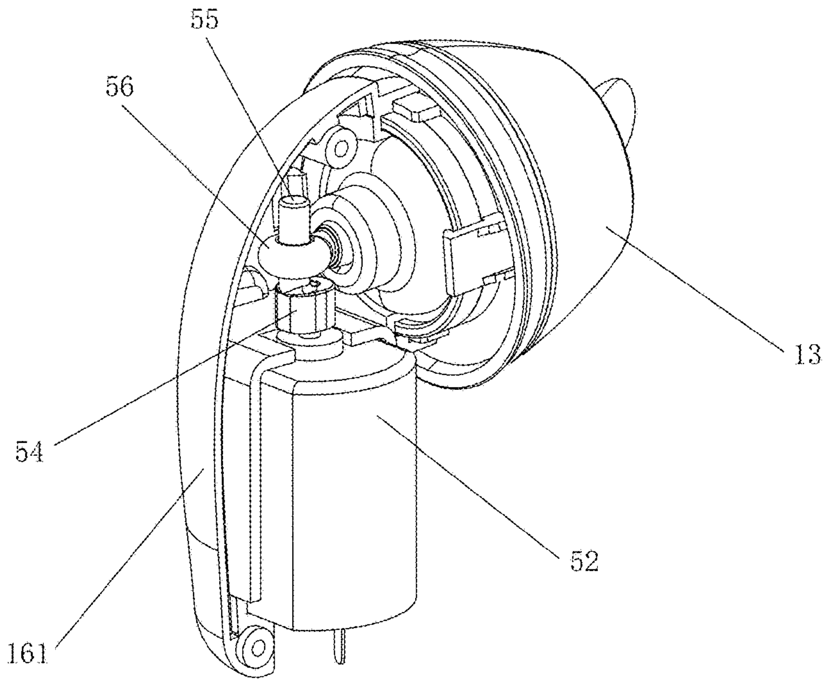
FIG. 16 is a schematic view of a third driving mechanism of the sexual stimulation device of FIG. 15.
Figure 17:
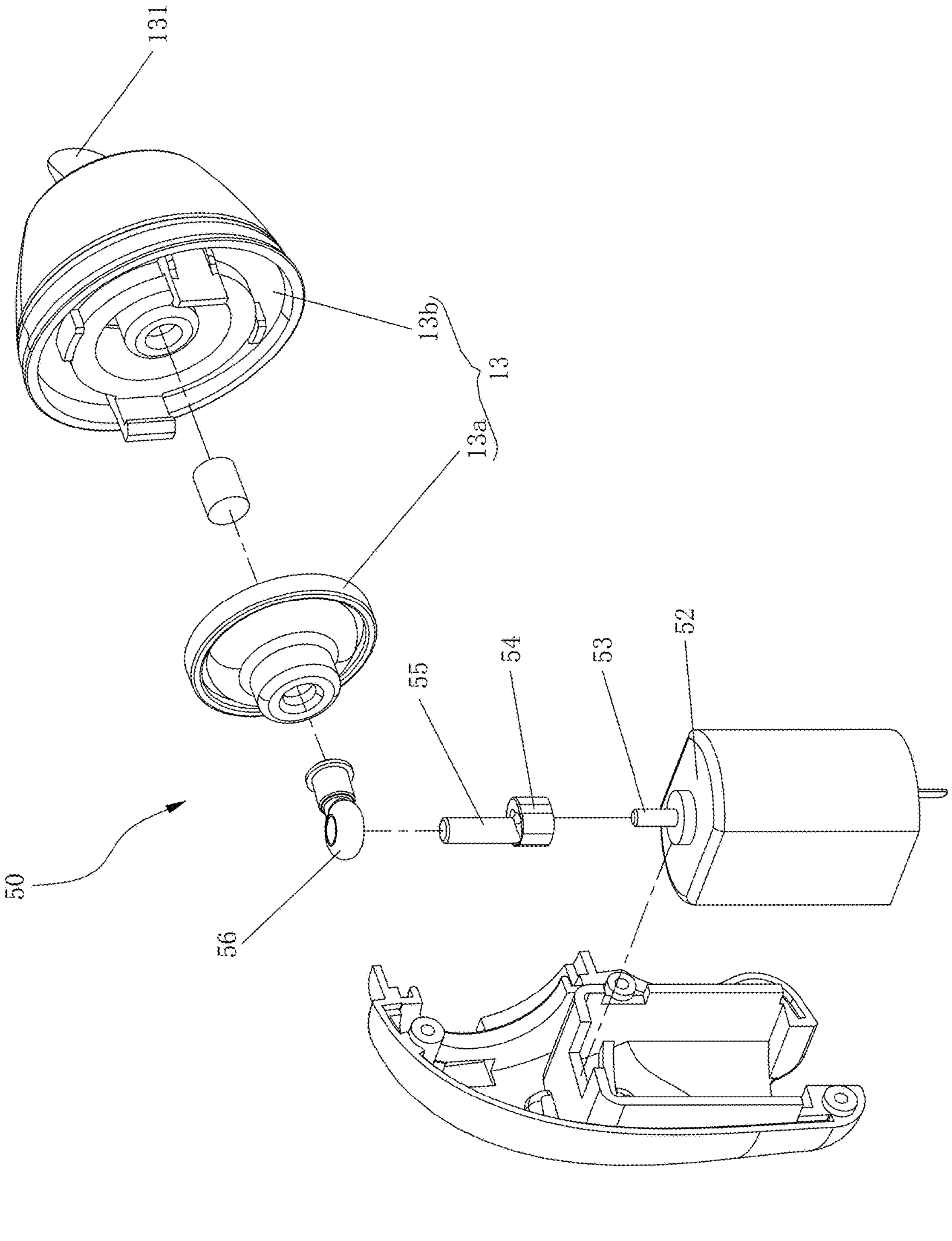
FIG. 17 is an exploded view of the third driving mechanism of FIG. 16.

As shown in FIGS. 16-17, the third driving mechanism 50 includes a gearbox 52, an eccentric wheel 54 driven by the gearbox 52, and a connecting rod 56 connected between the eccentric wheel 54 and the third massage portion 13. The eccentric wheel 54 is connected to an output shaft 53 of the gearbox 52 and rotates at an appropriate speed under the driving of the gearbox 52. The eccentric wheel 54 is provided with a pivot 55, which is arranged eccentrically relative to a rotary axis of the eccentric wheel 54, so that the pivot 55 rotates around the rotary axis of the eccentric wheel 54. One end of the connecting rod 56 is rotatably connected to the pivot 55, and the other end of the connecting rod 56 is fixedly inserted into the third massage portion 13, so that the gearbox 52 can drive the third massage portion 13 to swing through the eccentric wheel 54.

In this embodiment, the third massage portion 13 is a double-layer structure, including a third hard layer 13*a* and a third soft layer 13*b* covered on the third hard layer 13*a*. The third hard layer 13*a* may be a part of the inner shell 10*a*, and the third soft layer 13*b* may be a part of the outer shell 10*b*. The connecting rod 56 is connected to the third hard layer 13*a*, wherein the connecting rod 56 and the third hard layer 13*a* may be tightly fitted. A tongue 131 extends outward from a central portion of the third soft layer 13*b*, for licking the vulva of the human body, particularly the clitoris. When the gearbox 52 is started, the pivot 55 rotates around the rotary axis of the eccentric wheel 54, causing the connecting rod 56 to move back and forth in its axial direction and swing back and forth around the pivot 55, thereby driving the tongue 131 of the third massage portion 13 to move along a circular trajectory, which may also have a large stimulation range. The sexual stimulation device 100 of this embodiment includes three massage portions 12, 14, and 13, which are respectively driven by three driving mechanisms 20, 30, and 50. It can simultaneously stimulate three parts of the human body, with a larger stimulation range and better stimulation effect, further improving the user experience.

In this application, the sexual stimulation device has multiple massage portions for stimulating multiple positions of the human body simultaneously, wherein the second massage portion forms an annular trajectory, creating a kneading effect on the user's sensitive area, such as the vagina, the clitoris, the rectum, the prostate, and etc.; the first and/or second vibration motors can create a high-frequency vibration effect on the sensitive area; and the third massage portion can stimulates the vulva, particularly the clitoris. A combination of these stimulation makes the sexual organs, such as the clitoris or the prostate, more excited, so that the users are more likely to reach orgasm with the help of the present sexual stimulation device 100, resulting in better sexual life and better sexual experience. It should be understood that, based on the sexual organs to be stimulated, the shell, particularly the massage portions, may have different sizes and/or shapes.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sexual stimulation device, comprising:

a shell comprising a shell body, and a first massage portion and a second massage portion that extend outwardly from the shell body along a first direction, the first massage portion and the second massage portion being configured to be into the human body along the first direction, the first massage portion extends beyond the second massage portion in the first direction;

a first driving mechanism mounted in the shell for driving the first massage portion; and a second driving mechanism mounted in the shell for driving the second massage portion, the second driving mechanism comprising a swing arm connected to the second massage portion, wherein the swing arm is slidably and rotatably connected to the shell.

2. The sexual stimulation device according to claim 1, wherein the second driving mechanism further comprises a vibration motor provided in the second massage portion.

3. The sexual stimulation device according to claim 1, wherein in a second direction perpendicular to the first direction, the first and second massage portions are arranged side by side and spaced from each other, a lateral surface of the second massage portion away from the first massage portion acts as a massage surface of the second massage portion.

4. The sexual stimulation device according to claim 3, wherein the first massage portion and the second massage portion are configured to be inserted into a vagina or a rectum of the human body, and the massage surface of the second massage portion is a convex surface for contacting a rectum wall or a vaginal wall of the human body.

5. The sexual stimulation device according to claim 4, wherein the massage surface of the second massage portion is provided with patterns and/or protrusions.

6. The sexual stimulation device according to claim 3, wherein the first massage portion comprises a front end section extending beyond the second massage portion and a connecting section connected between the front end section and the shell body, and the first driving mechanism comprises a vibration motor provided in the front end section of the first massage portion.

7. The sexual stimulation device according to claim 6, wherein in the second direction, the maximum of a overall lateral size of the second massage portion and the connecting section of the first massage portion is substantially the same as the maximum lateral size of the front end section.

8. The sexual stimulation device according to claim 3, wherein the second massage portion moves along a circular trajectory or an elliptical trajectory in a longitudinal plane perpendicular to the second direction, and the massage surface of the second massage portion produces a kneading effect on the human body.

9. The sexual stimulation device according to claim 8, wherein the shell body is provided with a first shaft which extends along the second direction, the swing arm is provided with a sliding groove that is elongated along the first direction, and the first shaft is inserted into the sliding groove and slidable relative to the sliding groove;

the second driving mechanism further comprises a gearbox and a rotary member driven by the gearbox, a second shaft is eccentrically arranged on the rotary member, one end of the swing arm is fixedly connected to the second massage portion, and another end of the swing arm is pivotally connected to the second shaft.

10. The sexual stimulation device according to claim 9, wherein a length of the swing arm is not less than 2 cm, and an output speed of the gearbox does not exceed 1000 rpm.

11. The sexual stimulation device according to claim 1, wherein the shell is elongated and substantially rod-shaped, and the first direction is substantially the longitudinal direction of the shell.

12. The sexual stimulation device according to claim 1, wherein the second massage portion comprises a hard layer and a soft layer covering the hard layer, and the swing arm is fixedly connected to the hard layer.

13. The sexual stimulation device according to 12, wherein the shell body comprises an inner shell and an outer shell covering the inner shell, the soft layer of the second massage portion is integrally connected to the outer shell of the shell body and wrinkles are formed at a joint of the soft layer and the outer shell, and the hard layer of the second massage portion and the inner shell of the shell body are disconnected at a position corresponding to the wrinkles.

14. The sexual stimulation device according to claim 1, wherein a branch extends upwardly and forwardly from the shell body, and a third massage portion is provided at a distal end of the branch for stimulating a vulva of the human body.

15. The sexual stimulation device according to claim 14, wherein a third driving mechanism is provided in the branch for driving the third massage portion, the third driving mechanism comprises a gearbox, a wheel driven by the gearbox, a pivot being eccentrically arranged on the wheel, and a connecting rod with one end thereof being rotatably connected to the pivot and another end thereof being connected to the third massage portion.

16. The sexual stimulation device according to claim 14, wherein the third massage portion comprises a tongue extending outward from a central portion thereof for licking the vulva of the human body.

* * * * *